Patented Sept. 11, 1928.

1,683,682

UNITED STATES PATENT OFFICE.

LEON LILIENFELD, OF VIENNA, AUSTRIA.

PREPARATION OF ALKALI CELLULOSE AND CELLULOSE ETHERS.

No Drawing. Application filed June 16, 1923, Serial No. 645,913, and in Austria July 13, 1922. Renewed April 5, 1927.

In order to produce usable cellulose ethers of a high degree of etherification which dissolve in organic solvents without leaving undissolved fibers and which can be formed into clear, water-resistant, flexible products such as films, from an alkali cellulose containing a large percentage of water, it is necessary to use a very large amount of strong caustic alkali solution and a correspondingly large amount of an etherifying agent. For this reason alkali cellulose which has a low water content is preferred as a thorough alkylation or aralkylation can be achieved with a much smaller consumption of alkylating or aralkylating agents and the apparatus hence can be more economically utilized.

Such alkali celluloses of low water content have hitherto been made by the following processes:

1. A dehydration of alkali cellulose of higher water content, for example, in a "vacuum" which term is used in the present specification and claims in the same sense in which it is always used in connection with industrial processes, meaning at a pressure substantially below atmospheric, i. e. in a receptacle in which a reduction of pressure more or less nearly approaching an absolute vacuum is maintained; or by means of distillation with gasoline, petroleum or benzol until the water content has been sufficiently reduced.

2. Impregnation of cellulose by soaking in water or caustic alkali solution, pressing out a part of the water or alkali solution and treating the remainder with solid caustic alkali.

3. Treatment of cellulose at the start with solid caustic alkali or with a mixture of solid caustic alkali and a saturated solution of caustic alkali.

The first process has the disadvantage that the products made by treating the alkali cellulose dried in the above manner and containing at least 2 molecules of caustic alkali to 1 molecule of $C_6H_{10}O_5$, with alkylating or aralkylating agents, are only rarely completely soluble without leaving a residue, and what is the most important, the solutions leave usually brittle and inflexible products, (e. g. films).

The second method has the disadvantage that the amount of water which can be removed from the alkali cellulose by means of pressing, centrifuging or the like is limited. As a result this method is not adapted to produce alkali cellulose with as low a water content as is frequently desirable, in which case it is necessary to add considerable excess of solid caustic alkali which results in a considerable waste of alkylating or aralkylating agents, when making the ethers therefrom.

The third method sets a high lower limit on the amount of alkali as it is not easily possible to make a homogeneous mixture of the exceedingly voluminous cellulose with very small quantities of alkali.

Hence methods 2 and 3 are not entirely suitable, or at least are not best suited for use in the process of etherifying which is carried out in several stages where the first stage requires an alkali cellulose with a low alkali and water content.

The present invention is based upon my discovery that it is possible to dry alkali celluloses of any water content whatsoever to produce low water and alkali celluloses, which yield usable ethers on etherification, and which ethers are soluble in a sufficient number of organic solvents and give clear, water-resistant, flexible films, provided that the drying is carried out at temperature below ordinary room temperatures, (about 18° to 20° C.), and preferably below 10° to 15° C.

The low water content alkali celluloses produced by this method are adapted for use in either single stage or multi-stage alkylations or aralkylations. In other words it is now possible to prepare alkali celluloses of low water content which contain sufficient caustic alkali for etherification to a highly etherified product in a single operation, which etherified products are technically useful and water-resistant, and it is also possible to prepare alkali cellulose of low water content which contains only just sufficient caustic alkali to give an intermediate product of any desired degree of etherification. By varying the alkali and water content it is possible to produce intermediate products which are in such a low stage of etherification that they are completely insoluble or hardly soluble in water and organic solvents, (for instance glacial acetic acid). It is also possible to produce intermediate products that are partially or wholly soluble in cold water and which dissolve completely in organic solvents, (for instance glacial acetic acid), or which leave a comparatively small residue. Alkali celluloses prepared by this process are also useful for the production of products of various stages of etherification for instance intermediate products which are not homogeneous but which contain portions which are soluble in glacial acetic acid together with portions which are water-soluble, and portions which are alkali-soluble. Irrespective of whether the starting material is an alkali cellulose which contains sufficient alkali to form a highly etherified ether in one operation, or whether the alkali content suffices only for the formation of an intermediate product which must then be submitted to further alkylation or aralkylation, the final etherified products are readily soluble if the process has been properly carried out, and they give clear, water-resistant and flexible products such as films and artificial fibers.

Any of the following may be used as raw material, cellulose in any form, materials containing cellulose, conversion products or transformation products of cellulose such as a hydrocellulose which has not been degraded too far, (for instance artificial silk refuse or a cellulose hydrate made by precipitating viscose with acids and then washing and drying if necessary, or by heating and storing viscose for a long time and then washing and drying if desired or by precipitating cuprammonium cellulose derivative such as viscose precipitated by means of alcohol or salt solutions or by gentle heating. The term "cellulose" as used in the rest of this specification and claims, covers cellulose itself and the above mentioned conversion products and derivatives of cellulose. The raw material is soaked in an alkali solution and dried at a temperature under 20° C. and preferably between 10 and 15° C. until the mass retains the desired content of water.

For example the soaking may be in a solution of alkali which contains an excess of water but which also contains the right amount of caustic alkali for the particular etherification process which is to be used. Instead of an alkali solution a mixture of solid caustic alkali and saturated caustic alkali solution may be used if desired. It is also possible to impregnate with an excess of caustic alkali solution and then after standing for a longer or shorter time the excess may be removed by pressing, centrifuging, suction filtration, etc. Another modification consists in impregnating cellulose with an alkali solution and then adding solid caustic alkali to the mass (which may or may not have been pressed) and then drying according to this process.

If desired solid caustic alkali, preferably in powder form, may be mixed with the alkali cellulose, made by one of the above methods, preferably with cooling, before starting to dry by the present process.

The drying at a temperature below 20° C. and preferably below 10° C. can proceed immediately after the alkali cellulose has been prepared by one of the above methods, or the product can be stored for a longer or a shorter time at room temperature. The drying may be carried out in the presence of air, for example in a cold air blast or a cooled drying apparatus, but it is preferably carried out in an evacuated space or in an inert atmosphere, (for example hydrogen or nitrogen). The process may be carried out in a vacuum kneading machine, vacuum disintegrator, vacuum shelf dryer, vacuum drum or vacuum stirring apparatus. These apparatuses must be provided with cooling means, (a jacket with water, ice or a freezing mixture), or else the process must be carried out in a cold room, either natural or artificial. It is advisable to spread the alkali cellulose in thin layers during the drying or else to stir, knead or otherwise mix it.

In order to hasten the drying, it may take place in the presence of a dehydrator, (such as sulfuric acid, phosphorus pentoxide, zinc chloride, caustic lime, calcium chloride, solid caustic potash or the like). The temperature may go below 0° C. during the drying process if desired.

After the alkali cellulose has been dried to the desired water content, (or it may be dried to a lower content and the necessary water subsequently added), it can be etherified at once or it can be stored as long as is desired. If desired it may be first comminuted in a suitable machine, (shredder, disintegrator, mill, edge runner or the like).

The dried alkali cellulose can be converted into a highly etherified ether in one operation by treatment with the requisite amount of alkylating or aralkylating agent or it can be first turned into an intermediate product of a lower stage of etherification and then transformed into an ether of a higher stage of etherification by proper treatment with etherifying agents and caustic alkali, the procedure depending on the amount of alkali originally incorporated with the cellulose.

Any reagents which are capable of forming ethers when treated with alkali alcoholates or alcohols in the presence of alkalies may be used as etherifying agents. Alkyl and aralkyl esters of inorganic acids are especially suitable. The process may be carried out in open vessels or in vessels with reflux condensers, (when using dialkyl sulfates, benzyl chloride, ethyl iodide, etc.), or in autoclaves, (when using ethyl chloride, methyl chloride, ethyl bromide, etc.), the apparatus used depending on the boiling point of the etherifying reagent used. The alkylating or aralkylating agents may correspond in amount to the alkali present, or less of the alkylating or aralkylating agent may be used. An excess of alkylating or aralkylating agent can be used but in this case the reaction temperature should be kept as low as possible.

The temperatures and reaction times vary with the particular alkylating or aralkylating agent used. For instance when using ethyl chloride the reaction mixture is heated to 90 to 100° C. for many hours, (4 to 24), whereas when working with diethyl sulfate the temperature is much lower, (40 to 90° C.), and the reaction time is also shorter, (1 to 5 hours).

Excess of the alkylating or aralkylating agents, together with any volatile by-products formed, (for instance alcohols and ethers), may be recovered by distillation either at the end of the reaction partly or wholly during the course of the reaction.

The separation of the higher ethers proceeds as usual, that is the reaction mixture, diluted with water if necessary, is placed in a filter and the solution filtered off, the cellulose ethers can be washed with hot or cold water and are then dried. If desired the washing may be followed by washing with dilute acid, followed by a second washing with water and drying.

Example I.

(The parts are by weight in all the examples.)

100 parts of cellulose are impregnated within 1000 parts of a 20% sodium hydroxide solution and after standing from 24 to 72 hours are pressed until the weight has decreased to 600 parts. The pressed residue is then disintegrated and after standing for 1 to 3 days is placed in a vacuum shelf dryer or vacuum kneading machine, and is dried at a temperature below 15° C. and preferably below 10° C. until a test shows that the soda-cellulose contains from 10 to 25% of water. The dried soda-cellulose is then placed in an autoclave which may be rotated and which is provided with a stirring device, 200 parts of ethyl chloride is then added and the mixture is heated to 90 to 100° C. for 10 to 24 hours. During the reaction the mass is stirred and the autoclave is kept turning. After the autoclave has cooled off the contents may be mixed with water if desired and are poured into a filter or a decanting apparatus, washed with water, treated with dilute sulfuric or hydrochloric acid, again washed and then dried.

The resulting ethyl cellulose is a powdery flocculent substance which is soluble in a number of organic solvents, (for instance benzol-alcohol mixture, chloroform, alcohol, chloroform-alcohol mixture, chloroform-methyl-alcohol mixture, glacial acetic acid, amyl acetate, nitromethane, methyl-alcohol-methyl-acetate mixture, etc.), and these solutions give clear, transparent, flexible and water-resistant films when evaporated.

II

Process the same as in Example I but the drying is only continued until the alkali cellulose contains 20 to 35% water.

III 100 parts of cellulose are impregnated within 900 to 1000 parts of a 25% sodium hydroxide solution and after standing for 1 to 3 days the mass is pressed down to 350 parts. The disintegrated presscake after standing 2 to 3 days is spread out in thin layers and dried in vacuo to approximately constant weight with constant kneading or stirring.

The dried sodium cellulose which contains from 5 to 25% water is again disintegrated and placed in an autoclave with 90 to 100 parts of ethyl chloride and heated to 90 to 130° C. for 8 to 24 hours. After this time has elapsed, the autoclave is cooled and opened. A sample of the mixture can be washed with hot water and tested for solubility, and the test should show that the resulting intermediate product of lower degree of ethylation is entirely or mainly soluble in cold water, strong hydrochloric acid and glacial or strong acetic acid.

60 to 70 parts of powdered caustic soda are now rubbed into the mixture while cooling, and if the operation is carried out in the open air the mixture will absorb 10 to 30 parts of water during this operation. The mass is then again placed in the autoclave, 100 to 120 parts of ethyl chloride is added and the autoclave is heated to 90 to 100° C. to 10 to 20 hours while the autoclave is rotated or the mixture stirred.

The separation of the ethyl ether of cellulose which possesses about the same properties as that in Example I is carried out as in that example.

IV 100 parts of cellulose is impregnated with 900 to 1000 parts of an 18% sodium hydroxide solution and (if desired after standing 24 to 72 hours) the mass is pressed until it is reduced to 700 to 720 parts. The disintegrated presscake is stored for 2 to 3 days if desired and is then dried in a vacuum at below 15° C. or 10° C. respectively until constant weight as in the foregoing examples. The water content is 0 to 10%. The dried sodium cellulose, disintegrated if so desired, is then heated in a rotating autoclave with 75 parts of ethyl chloride for 8 to 20 hours at a temperature of 90 to 130° C. The resulting intermediate product is in large part soluble in strong hydrochloric acid, cold water and glacial acetic acid. The reaction mass is then kneaded with 60 to 100 parts of powdered caustic soda with cooling whereby 20 to 80 parts of water are absorbed if the operation is carried out in the presence of air. Finally the reaction mass is heated up with 100 to 160 parts of ethyl chloride in a rotating autoclave for 10 to 20 hours at 90 to 130° C. and worked up as in Example I.

An ethyl cellulose results which has the same solubility as the product of Example I.

*V*

Process the same as in Example IV except that the sodium cellulose is dried down to 10 to 20% water.

*VI*

100 parts of cellulose are soaked with 900 to 1000 parts of an 18% sodium hydroxide solution and after standing 1 to 3 days are pressed to 145 to 220 parts. The mass is disintegrated, stored for 24 to 72 hours if desired, and then dried in vacuo at a low temperature until constant weight, as in the foregoing examples. Water content is 0 to 5%. The mass is again disintegrated if desired and heated in an autoclave with 50 to 80 parts of ethyl chloride for 10 to 20 hours at 100 to 130° C., the autoclave being rotated or the mass stirred. The resulting intermediate has the following solubilities: 99.42% will dissolve in concentrated hydrochloric acid, 51.68% dissolves in 8% sodium hydroxide, 36.14% dissolves in concentrated acetic acid.

The reaction mixture is then rubbed up or kneaded with 60 to 100 parts of powdered caustic soda with cooling, and again placed in the autoclave and heated for 10 to 24 hours with 100 to 160 parts of ethly chloride while rotating the autoclave or stirring the mass.

The properties of the resulting ethyl cellulose correspond with those of Example I.

*VII*

Same process as in Example VI with the difference that the soda cellulose is dried down to a water content of 10 to 16%.

*VIII*

100 parts of cellulose are soaked in 1000 parts of an 18% sodium hydroxide solution and allowed to stand 12 to 48 hours. The mass is then pressed to 230 parts and then after standing 1 to 3 days is dried in a vacuum at a temperature below 15 and preferably below 10° C. until the weight has dropped to 145 parts. It is then disintegrated and heated with 30 to 50 parts of ethyl chloride in a rotating autoclave for 10 to 24 hours at 80 to 130° C. A sample of the intermediate product after washing with hot water dissolves in diluate, (5 to 10%), sodium hydroxide or concentrated hydrochloric acid or glacial acetic acid without residue or with only a very small residue. The solution in glacial acetic acid is quite viscous and on evaporating leaves a transparent flexible film. In order to transform the intermediate product into an ether of a higher stage of ethylation 60 parts of powdered caustic soda is rubbed into the reaction mixture with cooling, which results in the absorption of 20 to 60 parts of water if the operation is carried out in the presence of air. The mass is then heated with 128 parts of ethyl chloride in a rotating autoclave for 10 to 24 hours at 90 to 130° C. The product is then worked up as in the foregoing examples and the finished ethyl cellulose has the same properties as that described in Example I.

In the foregoing examples the cellulose is soaked with alkali and then pressed to a certain weight. The procedure may be modified by adding the amount of alkali solution corresponding to the amount left in the pressed product, the drying will then proceed without pressing. Otherwise the procedure is the same.

In the appended claims, the term "drying" is intended to embrace the removal of a part or all of the water present.

I claim:

1. In the process of preparing alkali celluloses of low water content by drying watery alkali celluloses, the step of drying below 18° C.

2. In a process of preparing alkali celluloses of low water content by drying watery alkali celluloses, the step which comprises drying in a vacuum at a temperature below 18° C.

3. In a process of preparing alkali celluloses of low water content the steps which comprise soaking the cellulose in an alkali solution and drying at a temperature below 10° C.

4. In a process of preparing alkali celluloses of low water content, the steps which comprise soaking the cellulose in an alkali solution and drying in a vacuum at a temperature below 10° C.

5. In a process of preparing alkali cellulose of low water content, the steps which comprise treating cellulose with alkali solution and solid caustic alkali, and drying the resulting product at a temperature below 15° C.

6. In the process of preparing alkali celluloses of low water content the steps which comprise impregnating cellulose with alkali solution, removing part of the alkali solution and drying the residue at a temperature below 18° C.

7. In a process of preparing alkali celluloses of low water content, the steps which comprise impregnating cellulose with an alkali solution, removing part of the alkali solution and then drying the residue at a temperature below 10° C.

8. In a process of preparing alkali celluloses of low water content the steps which comprise impregnating the cellulose with an alkali solution, removing part of the solution, and drying the residue in a vacuum at a temperature below 18° C.

9. In a process of preparing alkali celluloses of low water content the steps which comprise impregnating the cellulose with an alkali solution, removing part of the solution and then drying the residue in a vacuum at a temperature below 10° C.

10. In a process of preparing alkali celluloses of low water content the steps which comprise impregnating cellulose with an alkali solution, removing part of the solution, mixing solid caustic alkali with the residue and drying the product at a temperature below 15° C.

11. In a process of preparing alkali celluloses of low water content the steps which comprise impregnating cellulose with an alkali solution, removing part of the alkali solution, mixing solid caustic alkali with the residue and drying the product in a vacuum at a temperature below 15° C.

12. The process of preparing cellulose ethers which comprises treating with etherifying agents, an alkali cellulose which has been deprived of at least part of its water content by drying at a temperature below 18° C.

13. The process of preparing cellulose ethers which comprises treating with etherifying agents on alkali cellulose which has been deprived of at least part of its water content by drying at a temperature below 10° C.

14. The process of preparing cellulose ethers which comprises treating with etherifying agents and alkali cellulose which has been deprived of at least part of its water content by drying in a vacuum at a temperature below 18° C.

15. The process of preparing cellulose ethers which comprises treating with etherifying agents an alkali cellulose which has been deprived of at least part of its water content by drying in a vacuum at a temperature below 10° C.

16. The process of preparing cellulose ethers which comprises impregnating cellulose with an alkali solution, removing at least part of its water content by drying in a vacuum at a temperature below 15° C. and then treating the product with etherifying agents.

17. The process of preparing cellulose ethers which comprises impregnating cellulose with an alkali solution, removing part of the alkali solution, drying the residue in a vacuum at a temperature below 15° C., to remove at least part of its water content and then treating the resulting product with etherifying agents.

18. The process of preparing cellulose ethers which comprises drying an alkali cellulose which contains solid caustic alkali in addition to alkali solution, in a vacuum at a temperature below 15° C., and then treating the resulting product with etherifying agents.

19. The process of preparing cellulose ethers which comprises preparing an intermediate product of a lower stage of etherification by treating with etherifying agents an alkali cellulose which has lost at least part of its water content by drying in a vacuum at a temperature below 15° C., and further etherifying the product by treating it with caustic alkali and etherifying agents.

20. The process of preparing cellulose ethers which comprises preparing an intermediate product of a lower stage of etherification by treating with etherifying agents an alkali cellulose which has lost at least a part of its water content by drying in a vacuum at a temperature below 10° C., and then further etherifying the product by treating it with caustic alkali and an etherifying agent.

In testimony whereof I affix my signature.

LEON LILIENFELD.